(12) United States Patent
Tesvich

(10) Patent No.: US 9,816,240 B1
(45) Date of Patent: Nov. 14, 2017

(54) SEDIMENT SUCTION SINK AND METHOD FOR SEDIMENT CONTROL IN RIVERS, STREAMS, AND CHANNELS

(71) Applicant: John A. Tesvich, Buras, LA (US)

(72) Inventor: John A. Tesvich, Buras, LA (US)

( * ) Notice: Subject to any disclaimer, the term of this patent is extended or adjusted under 35 U.S.C. 154(b) by 8 days.

(21) Appl. No.: 14/843,511

(22) Filed: Sep. 2, 2015

Related U.S. Application Data

(60) Provisional application No. 62/044,703, filed on Sep. 2, 2014.

(51) Int. Cl.
*E02B 3/02* (2006.01)
*E02B 3/04* (2006.01)
*G01M 99/00* (2011.01)

(52) U.S. Cl.
CPC .............. *E02B 3/023* (2013.01); *E02B 3/041* (2015.09); *G01M 99/00* (2013.01)

(58) Field of Classification Search
CPC .................................. E02B 3/023; E02B 3/041
See application file for complete search history.

(56) References Cited

U.S. PATENT DOCUMENTS

| | | |
|---|---|---|
| 1,197,267 A | 9/1916 | Cressy |
| 2,961,782 A | 11/1960 | Bos |
| 3,013,395 A | 12/1961 | Gaylord |
| 3,591,936 A | 7/1971 | Van Geuns |

(Continued)

FOREIGN PATENT DOCUMENTS

| | | |
|---|---|---|
| DE | 19904958 | 8/2000 |
| EP | 1048793 | 11/2000 |

(Continued)

*Primary Examiner* — Tara M. Pinnock
(74) *Attorney, Agent, or Firm* — Garvey, Smith & Nehrbass Patent Attorneys, L.L.C.; Vanessa M. D'Souza; Julia M. FitzPatrick

(57) ABSTRACT

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration. The apparatus preferably comprises a sediment harvesting platform preferably positioned above a water surface; a sediment suction inlet or sediment sink preferably positioned below the top level of source sediment or within a sand bar including a grating, a sediment pump, a venturi including an auger/propeller, and a water jet; a flow control valve; and a pipeline for pumping sediment. The apparatus may further comprise a sediment conveyor including sediment inlets and a remote controlled pulsing valve. The apparatus may further comprise sensor(s) and a programmable logic controller (PLC). The method of the present invention preferably comprises removing sediment from waterway bottoms with at least one apparatus of the present invention. The system of the present invention preferably comprises a plurality of apparatuses in either series or parallel design for sediment control and altering the average effective depth in a section of a waterway.

20 Claims, 6 Drawing Sheets

(56) References Cited

U.S. PATENT DOCUMENTS

| | | | |
|---|---|---|---|
| 3,620,371 A * | 11/1971 | Valdespino | B01D 29/01 210/117 |
| 3,975,842 A | 8/1976 | Andreae | |
| 4,058,914 A | 11/1977 | Kiss | |
| 4,149,251 A | 4/1979 | Noordermeer et al. | |
| 4,401,576 A | 8/1983 | Meurer | |
| 4,604,000 A | 8/1986 | van Weezenbeek | |
| 4,711,597 A | 12/1987 | Odgaard et al. | |
| 4,807,373 A | 2/1989 | Sloan et al. | |
| 4,819,347 A | 4/1989 | Lofgren | |
| 4,830,541 A | 5/1989 | Shatto | |
| 4,943,186 A | 7/1990 | Van Weezenbeek | |
| 5,135,579 A | 8/1992 | Goettl | |
| 5,143,623 A | 9/1992 | Kroll | |
| 5,285,587 A | 2/1994 | Krenzler | |
| 5,421,105 A | 6/1995 | Schulte | |
| 6,042,733 A | 3/2000 | Tucker | |
| 6,112,439 A | 9/2000 | Rinker | |
| 6,550,162 B2 | 4/2003 | Price et al. | |
| 7,226,242 B2 | 6/2007 | LeBuffe | |
| 7,591,088 B1 | 9/2009 | Schuh et al. | |
| 7,621,059 B2 | 11/2009 | McCoy, Jr. et al. | |
| 7,676,966 B2 | 3/2010 | Taplin | |
| 7,850,857 B2 | 12/2010 | Tucker | |
| 7,943,039 B1 | 5/2011 | LeBuffe | |
| 8,522,459 B2 | 9/2013 | Pavan | |
| 2002/0012571 A1 | 1/2002 | Nichols | |
| 2005/0211607 A1 | 9/2005 | Armbruster | |
| 2009/0084735 A1 | 4/2009 | Taplin | |
| 2009/0097920 A1 * | 4/2009 | Tucker | E02B 3/023 405/74 |
| 2012/0067807 A1 | 3/2012 | Lappeman | |
| 2013/0022399 A1 | 1/2013 | Pierce, Jr. | |

FOREIGN PATENT DOCUMENTS

| | | |
|---|---|---|
| JP | 2005220598 | 8/2005 |
| WO | 2004/065700 | 8/2004 |
| WO | 2006/107984 | 10/2006 |
| WO | 2012/153169 | 11/2012 |
| WO | 2013/061006 | 5/2013 |

* cited by examiner

SEDIMENT SUCTION SINK AND METHOD FOR SEDIMENT CONTROL IN RIVERS, STREAMS, AND CHANNELS

CROSS-REFERENCE TO RELATED APPLICATIONS

This application claims the benefit of U.S. Provisional Patent Application Ser. No. 62/044,703, filed 2 Sep. 2014, which is incorporated herein by reference.

Priority of U.S. Provisional Patent Application Ser. No. 62/044,703, filed 2 Sep. 2014, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration.

2. General Background of the Invention

Dredging water-bottoms is a common practice that is normally accomplished by floating vessels located on the water body, such as barges with draglines mounted on deck, or specialized hydraulic dredges like cutter-head suction dredges or hopper dredges. Dredging is mainly utilized for the purpose of maintaining water depth for navigation, but also is used to pump sediments to build or rebuild coastal lands, beaches and etc.

Shoaling of navigational channels is a natural process. Maintaining depth contours in navigational channels in the United States requires significant expenditures by the state and federal agencies (aka U.S. Army Corps of Engineers & etc.) that are responsible for that task. When dredging is being accomplished, the dredges are physically located in the navigational water body in the area that requires dredging. Navigation on the water-body is most often restricted in some way due to the dredging work being done. Sometimes in narrow channels, restriction is severe, and navigational is disrupted in intervals during the course of the dredging operations.

When dredges are employed for maintenance of water depth in a water-body the sediment that is removed may be deposited on-board the vessel such as for hopper barges, or it may be transposed via a mechanical bucket into a deeper area in the water-body usually where there is sufficient current to carry it some distance away, or in the case of a hydraulic suction dredge, it may be put into a pipeline and then deposited any amount of distance away as is required.

Dredges can also be employed for moving sediment for the purpose of building, rebuilding or filling land. Depending on the type of dredge, the sediment is either hauled on-board, and then moved and deposited at another location or it is put into a hydraulic slurry pipeline that can move water laden sediment scores of miles away.

Coastal land loss is a worldwide problem. Coastal land loss is both a natural process and is often aggravated by man-made alterations to the natural environment. Natural land loss is caused by shoreline erosion caused by normal waves and currents within water-bodies. This type of erosion is further aggravated during natural storms. Natural subsidence of coastal wetlands is also commonly caused by compaction and biodegradation of organic material within the sediment layers under the surface. Man-made causes that can contribute of coastal land loss can include the following: 1) Locks and dams on streams and rivers, 2) placement of levees on rivers and streams for flood protection, 3) jetties on seashores, coastal inlets, rivers, and streams, 4) man-made canals for navigation, coastal development, oil & gas access and pipelines, and etc., 5) extraction of underground minerals, oil, and gas in coastal areas, 6) wakes of marine vessels, 7) sea level rise accelerated by global warming.

A prime example of an area that is experiencing significant coastal land-loss is present day coastal Louisiana. Louisiana has been losing its coastal wetlands at a rate as high as 16,000 acres a year. The rate in 2012 of wetlands loss is estimated to be around 10,600 acres per year. In the 1990's the state had begun addressing the coastal land-loss problem more aggressively. The devastation wrought by hurricanes Katrina, Rita, Gustav, and Ike in the 2005-2008 significantly amplified the need for coastal restoration, and the interrelated issue of coastal flood protection. In response the State of Louisiana developed its "Comprehensive Master Plan for Coastal Restoration and Flood Protection" or "Master Plan". The Master Plan is a comprehensive conglomerate of projects designed to address the needs for flood protection and wetlands restoration. The latest Master Plan is the 2012 version, and it is to be renewed every 5 years as studies advance the knowledge of the best methods for addressing the problems of coastal wetlands loss and flood protection. The estimated cost to carry out the projects included in the 2012 Master Plan is $50 billion.

The Master Plan includes many projects that will require dredging of sediments for rebuilding barrier islands and marsh creation. Dredging sediments and moving them within a pipeline is a proven way to build/rebuild coastal land. With numerous projects of dredging for marsh creation already completed, there are known cost/benefit figures for this rebuilding option. However, dredging methods, currently used for wetland creation projects, are relatively expensive, with significant fuel cost, labor cost, and mobilization and demobilization costs.

The Master Plan also includes numerous river diversion projects, including "large-scale" river diversions. There is significant and vocal support for these projects, even though sediment diversions are unproven in their ability to build/rebuild land. Proponents for sediment diversions believe that they are superior to dredging, when considering the cost long-term land-building, citing that burning diesel fuel (for dredges) for rebuilding lands is not eco-friendly and unsustainable because it is too costly.

Opponents of river diversions cite that it will take decades if not centuries to restore significant amounts of wetlands. Large-scale river diversions would also cause significant negative impacts and unintended consequences. Diverting large amounts of river water into a brackish-saltwater estuary raises concerns for 1) displacement of traditional fisheries, and critical fisheries habitat, 2) flooding issues for coastal communities, 3) introduction of invasive species, 4) introduction of river-borne pollutants including nutrients from agricultural runoff.

Large-scale river diversions would also have significant unintended consequences on the river channel itself. Diverting river water impacts the hydrodynamics of the river downstream because it takes water away from the traditional river channel, decreasing water velocity downstream. Therefore, river diversions are expected to increase shoaling in down-river areas. This can impact navigation and increase channel maintenance costs.

The current dilemma is that most of the sediments carried by the Mississippi River is wasted and winds up deposited in deep waters of the Gulf of Mexico. The future sustainability of Louisiana's wetlands and the viability of flood protection along the coastal area would be greatly improved if long-term, economical methods were developed for harvesting sediment from the river. An overall goal should be to utilize methods of moving sediment with lower cost while creating less negative unintended consequences. Presently, which of the currently available methods is better is an on-going debate.

It is the intent of the present invention to provide another method that is superior in many ways to currently available methods of harvesting sediments for coastal restoration. A method that is robust, dependable, for long-term harvesting of sediment from a river, such as the Mississippi River. The present invention will be less labor intensive, and environmentally cleaner than diesel-powered dredges, and will have less negative impacts than large-scale river diversions.

The bottom contours of many of U.S. Rivers are being mapped for navigational purposes. The Mississippi River, for example, is mapped and studied extensively by the US Army Corp of Engineers (USACE). Studies by the USACE have shown that burrow areas, where the river has been dredged for sediment removal, have a refill rate of around 80% in one year. The USACE also has computerized modeling programs that predict the effect of changes that affect the river's flow. Predictive computer models can be used to determine best locations for placement of fixed sediment harvesting apparatuses.

The prior art has numerous designs for dredging and sediment removal systems. Prior art teaches many variations in sediment collecting pipes, cells, basins and etc. Also there has been disclosed various methods of evacuating the sediments from the waterway using pump positive pressure or pump suction. The reason that most all of the dredging done today is still done by vessel-based suction dredge is because of its real-world adaptability and robustness in the design. The present invention is novel and unique in that the incorporation of a platform-based dredge system gives it robustness, and the design of the mechanical parts gives it redundancy to deal with natural obstacles that cannot be avoided on the bottom of a muddy waterway.

The following references are incorporated herein by reference: U.S. Pat. Nos. 1,197,267; 2,961,782; 3,013,395; 3,591,936; 3,975,842; 4,401,576; 4,604,000; 4,711,597; 4,807,373; 4,819,347; 4,830,541; 4,819,347; 4,830,541; 4,943,186; 5,135,579; 5,143,623; 5,285,587; 5,421,105; 6,042,733; 6,550,162; 7,226,242; 7,621,059; 7,676,966; 7,850,857; 7,943,039; 8,522,459; U.S. Publication Document Nos.: 2002/0012571; 2005/0211607; 2009/0084735; 2012/0067807; 2013/0022399; PCT Publication Nos.: WO2004/065700; WO2006/107984; WO 2012/153169; WO2013/061006; Foreign Patent Publication Nos.: DE 19904958; EP 1048793; and JP 2005220598.

BRIEF SUMMARY OF THE INVENTION

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration. The apparatus of the present invention preferably comprises a sediment harvesting platform preferably positioned above a water surface. A sediment suction inlet or sediment sink can be preferably positioned below the top level of source sediment or within a sand bar including a grating. The apparatus can include a sediment pump, a venturi including an auger/propeller, and a water jet, a flow control valve and a pipeline for pumping sediment. The apparatus can further comprise a sediment conveyor including sediment inlets and a remote controlled pulsing valve. The apparatus may further comprise sensor(s) and a programmable logic controller (PLC). The method of the present invention preferably comprises removing sediment from waterway bottoms with at least one apparatus of the present invention. The system of the present invention preferably comprises a plurality of apparatuses in either series or parallel design for sediment control and altering the average effective depth in a section of a waterway.

A preferred embodiment of the present invention is an apparatus comprising a sediment harvesting platform that can be placed in rivers and waterways to harvest sediment from sand bars. It is preferably a fixed platform, preferably constructed of steel, mounted above the water level. The platform preferably houses the power supply, controls, booster pump, and provide connections to sediment flow lines.

Preferably below the platform and deep within the sand bar, a sediment sink preferably draws in sediment by fluidizing sediment and pumping the sediment into a pipeline.

The sediment harvesting platform is preferably placed in the rivers bars that normally form closer to a river's bank.

In one embodiment, the platform may further comprise: (1) a secondary sediment pump; (2) a water pump; (3) a hydraulic pump and control unit; (4) power supply and connections; (5) sediment pipeline connections; and (6) monitoring and control unit.

The source of power for the sediment harvesting platform will be preferably electrical or diesel engine/generator, with land based electrical supply being the preferred embodiment.

In one embodiment, the power source is from land-based electricity.

In one embodiment, the power source is from fossil fuel powered engines.

In one embodiment, electrical power is preferably supplied to the platform by submarine cable.

In one embodiment, electrical power is preferably supplied to the platform by overhead power lines.

The sediment harvesting platform is preferably used to capture sediments to be put into long distance sediment pipelines that will be used to rebuild sections of coastal lands many miles away.

A preferred embodiment of the present invention is an apparatus further comprising a sediment sink preferably positioned below the waterway surface. The sink preferably comprises: (1) a hydraulically or electrically driven primary sediment pump; (2) an auger to break up compacted sediments and feed the sediment inlet; (3) water jets to help liquefy the sediment for better sediment flow.

A preferred embodiment of the present invention is an apparatus further comprising a flow control valve that preferably regulates how much clean water is fed into the suction side of the sediment pump.

In order to extend the harvesting capacity, the sediment harvesting platform may also incorporate mechanical or hydraulic means to draw more sediment into the sink.

A preferred embodiment of the present invention is an apparatus further comprising a conveyor positioned radially outward from the sediment sink. The conveyors preferably include sediment inlets and preferably transport additional sediment from the area that surrounds the sediment platform.

In one embodiment, the conveyor is hydraulic.

In one embodiment, the conveyor is mechanical.

In one embodiment, the apparatus further comprises a plurality of conveyors.

In one embodiment, the apparatus further comprises a sensor mounted within it to preferably monitor important parameters in real time and send the measurements into a programmable logic controller (PLC) that will control the operation of the apparatus.

A preferred embodiment of the present invention includes a method for removing sediment from waterway bottoms with the apparatus of the present invention.

One embodiment is a method for removing sediment from waterway bottoms with a plurality of apparatuses of the present invention.

In one embodiment, this invention can be used to contribute additional sediment to smaller localized river diversions to boost that project's sediment delivery. In this embodiment, the invention is preferably design to be scalable and will preferably work for both relatively small-scale apparatuses and large-scale apparatuses alike.

The properties of the invention will preferably allow for deployment of a fixed system within rivers and water streams that will be able to harvest sediment more cost effectively than existing methods. It will be much less labor intensive because of automation, and "greener" because it can operate off of the existing electrical power grid.

In one embodiment, the invention is a system incorporating individual apparatus (unit) for removing sediment from waterway bottoms and pumping the sediment through pipelines.

In one embodiment, the invention is a system incorporating an array or arrays of apparatuses (units). In this embodiment, the apparatuses of the array are preferably connected together by pipelines in series or in parallel design.

In one embodiment, the present invention is a fixed suction inlet or "sediment sink" for evacuating sediment and any other type of granular material in a fluid state through a pipeline. In this embodiment, the apparatus/apparatus comprises a suction inlet and a sediment sink that preferably draws sediment and other material into a pipeline in a fluid state. The apparatus of this embodiment is preferably a mechanical element, which is preferably mounted in a fixed position below a source of sediment or granular material, for the purpose of evacuating the material by carrying it within a liquid (e.g. water) via a pipeline. The apparatus of this embodiment is preferably positioned well below the level of the source sediment or granular material so that the material, which is in the proximity of the inlet, will preferably flow downward toward the inlet aided by gravity. The apparatus of this embodiment may be held in a fixed position by a structure under the normal surface of the sediment. For example in a river, the sediment inlet may be held by pilings driven into the seabed, well below the elevation of the suction inlet. The properties of the apparatus will allow for deployment of a fixed system within rivers and water streams that will be able to harvest sediment more efficiently, and have better control of sedimentation than existing methods.

This invention brings many benefits in the task of harvesting sediments that a river bed provides while minimizing the negative impacts that traditional dredging or river sediment diversions would create. Most of the heavier sediments in the river travel along the river bottom especially when river velocities are lower. Heavier, larger grain sediments are preferred land building material for restoration purposes. This invention will preferably act like a sink in the bottom of the river bed and capture sediment passively as sediment moves down-river in the vicinity of the sink. Because it is on the bottom it will be able to capture sediment for a much longer period than sediment diversions. This invention will preferably provide a new method that can be used to control the sediment flow in a river or other waterway. By harvesting sediment from the river, it will preferably reduce down-river shoaling, and the associated costs of channel maintenance dredging.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration. The apparatus preferably comprises a sediment harvesting platform preferably positioned above a water surface. A sediment suction inlet or sediment sink can preferably be positioned below the top level of source sediment or within a sand bar including a grating, a sediment pump, a venturi including an auger/propeller, and a water jet, a flow control valve, and a pipeline for pumping sediment. The apparatus may further comprise a sediment conveyor including sediment inlets and a remote controlled pulsing valve. The apparatus may further comprise sensor(s) and a programmable logic controller (PLC). The method of the present invention preferably comprises removing sediment from waterway bottoms with at least one apparatus of the present invention. The system of the present invention preferably comprises a plurality of apparatuses in either series or parallel design for sediment control and altering the average effective depth in a section of a waterway.

Figure 1:
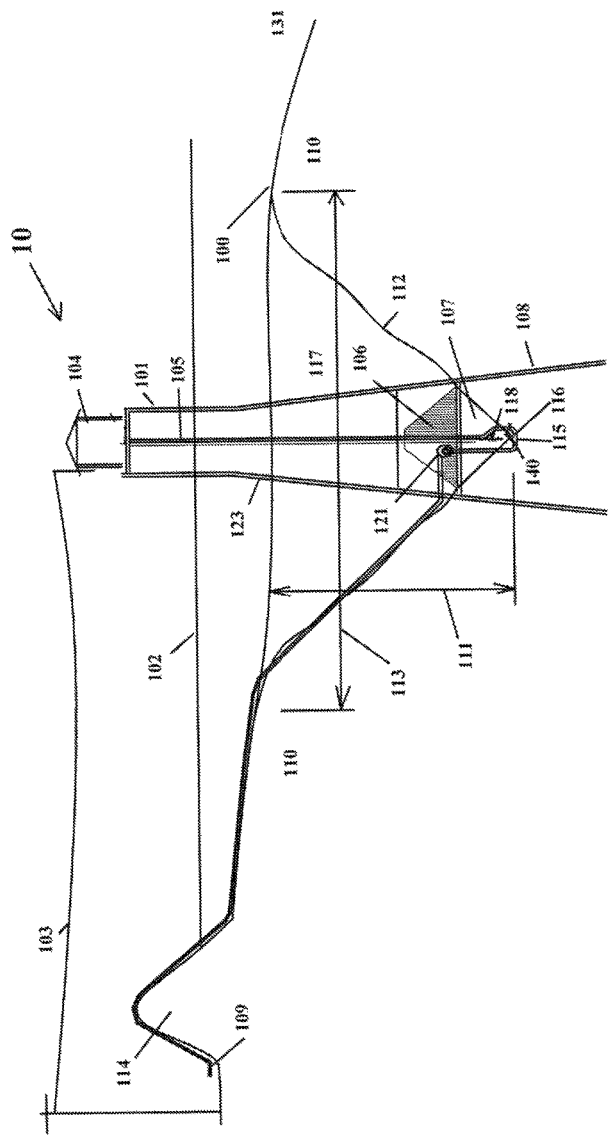
FIG. 1 is a side view of a preferred embodiment of the apparatus of the present invention of a sediment harvesting platform in a cross-section of a river.
Figure 2:
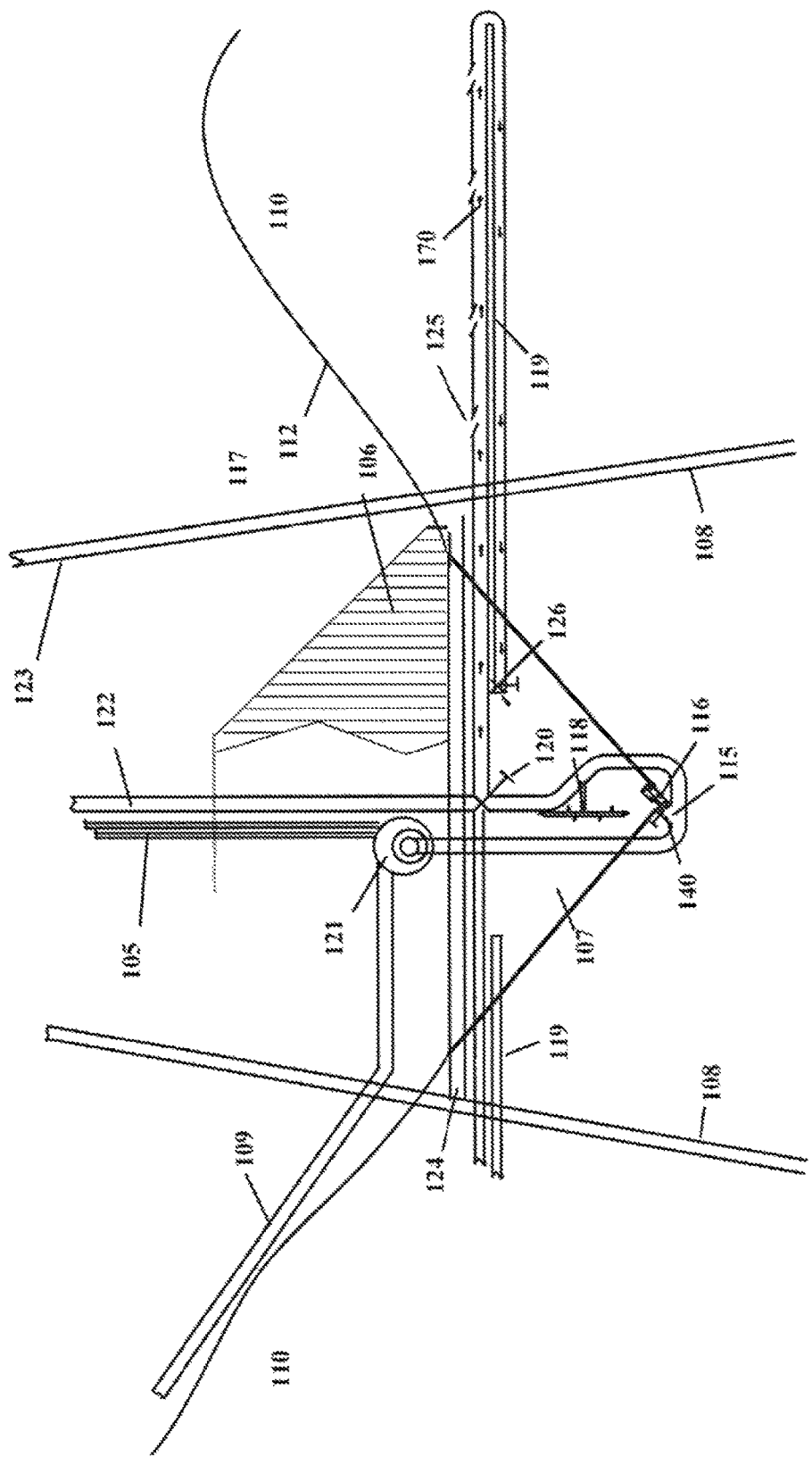
FIG. 2 is a sectional view of a preferred embodiment of the apparatus of the present invention showing the sediment sink with mechanical features.

FIG. 1 is a side view showing a preferred embodiment of the apparatus 10 of the present invention of a sediment harvesting platform 101 in a cross-section of a river comprising a sediment harvesting platform 101 preferably positioned above a water surface, a sediment suction inlet or sediment sink 107 preferably positioned below the top level of source sediment including a grating 106, a sediment pump 121, a venturi 115 including an auger/propeller 116, a water jet 118, a flow control valve 120, and a pipeline 109 for pumping sediment. FIG. 2 is a sectional view of a preferred embodiment showing the apparatus 10 further comprising a sediment conveyor 119 including sediment inlets 125 and a remote controlled pulsing valve 126.

The sediment harvesting platform 101 is fabricated preferably of steel and is preferably designed to be high enough above the river surface 102 to prevent flooding and to be hurricane proof.

Alternatively, the platform of any embodiment of the present invention can be made of reinforced concrete, plastic, or composite material.

The platform is preferably mounted at height of 5 to 50 feet high above the water level. More preferably, the platform is mounted at height of 10 to 30 feet high above the water level. Most preferably, the platform is mounted at height of 15 to 20 feet high above the water level.

The electrical power supply is preferably connected by overhead wire 103 or by underground cable. The platform 101 preferably includes a shelter 104, which preferably houses mechanical equipment, electrical equipment, electronic controls, etc.

The height of the shelter is preferably 6 to 40 feet. More preferably, the height of the shelter is 8 to 30 feet. Most preferably, the height of the shelter is 10 to 20 feet.

The length of the shelter is preferably 10 to 100 feet. More preferably, the length of the shelter is 15 to 80 feet. Most preferably, the length of the shelter is 20 to 30 feet.

The width of the shelter is preferably 10 to 80 feet. More preferably, the width of the shelter is 15 to 80 feet. Most preferably, the width of the shelter is 20 to 30 feet.

Preferably below the platform is a sediment sink 107 that can be buried within the natural sand bar in the river. The sediment sink is preferably made of metal or concrete, with side walls that can be shaped in a configuration of a cone or an inverted pyramid. Alternatively, the sediment sink can have a square or rectangular shape, with side walls in a generally vertical position. The base of the sediment sink can be shaped in a square configuration.

Alternatively, the sink of any embodiment of the present invention can be made of plastic or composite materials.

The sediment sink 107 can include a steel grating 106, which is preferably made of pipes or flat-bars that can cover the top of the sediment sink to prevent debris and obstructions from entering the sink. Alternatively, the grating of any embodiment of the present invention can be made of plastic or composite materials.

The depth of the sediment sink is preferably 5 to 150 feet. More preferably, the depth of the sediment sink is 10 to 100 feet. Most preferably, the depth of the sediment sink is 20 to 50 feet.

The sediment sink can be positioned at a depth below the river bottom of 5 to 150 feet. More preferably, the sediment sink can be positioned at a depth of 10 to 100 feet. Most preferably, the sediment sink can be positioned at a depth of 20 to 80 feet.

The length of the sediment sink is preferably 10 to 300 feet. More preferably, the length of sediment sink can be 20 to 200 feet. Most preferably, the length of the sediment sink can be 30 to 150 feet.

The width of the sediment sink can preferably be 10 to 300 feet. More preferably, the width of the sediment sink can be 20 to 200 feet. Most preferably, the width of the sediment sink can be 30 to 150 feet.

The height of the sediment sink is preferably 3 to 100 feet. More preferably, the height of the sediment sink can be 7 to 70 feet. Most preferably, the height of the sediment sink can be 10 to 50 feet.

The grating 106 of the sediment sink preferably prevents debris and obstructions of a size greater than 12 inches from entering the sink. More preferably, the grating 106 of the sediment sink prevents debris and obstructions of a size greater than 6 inches from entering the sink. Most preferably, the grating 106 of the sediment sink prevents debris and obstructions of a size greater than 3 inches from entering the sink.

Steel pilings 108 and support structure 124 can preferably be embedded into the riverbed to preferably hold the sink 107 in place and attach the sink 107 to the legs 123 of the platform above.

Alternatively, the pilings 108 and support structure of any embodiment of the present invention can be made of wood, plastic, or composite material.

The pilings 108 have a preferable thickness of 4 to 48 inches. More preferably, the pilings 108 have a thickness of 6 to 36 inches. Most preferably, the pilings 108 have a thickness of 12 to 24 inches.

The pilings 108 have a preferable length of 10 to 100 feet. More preferably, the pilings 108 have a length of 20 to 80 feet. Most preferably, the pilings 108 have a length of 30 to 60 feet.

Water lines, hydraulic power lines, and electrical control cables 105 preferably connect the equipment on the platform 101 to the sediment sink 107.

The sediment pipeline 109 preferably transports the sediment slurry from the sediment sink to the shore going over the flood protection levee 114. The sediment harvesting platform can be mounted in the area of a river where sediments naturally accumulate in the sandbar 110. The sediment sink can be placed well below the surface of the sandbar, giving the overall depth of the sediment pit 111.

The depth of the sediment pit can be preferably 10 to 300 feet. More preferably, the depth of the sediment pit can be 20 to 200 feet. Most preferably, the depth of the sediment pit can be 40 to 160 feet.

The cavity above the sediment sink that can be open to the river channel can have a width 113 determined by the slope of the sediment pit wall, 112. Preferably, the general capacity of the sediment sink is directly proportional to the open area in the sandbar that the sediment pit forms.

The width of the sediment pit is preferably 20 to 600 feet. More preferably, the width of the sediment pit can be 40 to 400 feet. Most preferably, the width of the sediment pit can be 80 to 300 feet.

In the sediment sink 107, sediment is preferably liquefied and fed into the suction side of the sediment pump 121. The pressurized water supply 122 for the sediment sink is preferably provided from the platform near the river surface, where the water is cleaner. The outflow from the sediment pump 121 is preferably placed into the outflow pipeline 109.

The sediment pump 121 preferably has an output pressure of 5 to 100 psi (pounds per square inch). More preferably, the sediment pump 121 has an output pressure of 10 to 80 psi. Most preferably, the sediment pump 121 has an output pressure of 20 to 60 psi.

The diameter of the outflow pipeline 109 is preferably 3 to 36 inches. More preferably, the diameter of the outflow pipeline 109 can be 4 to 24 inches. Most preferably, the diameter of the outflow pipeline 109 can be 6 to 18 inches.

When water circulation is started through the sediment pump 121, a venturi 115, preferably located at the bottom of the sediment sink inlet, can create suction and liquefies sediment at the bottom of the sink. A hydraulic powered auger/propeller 116 can be located within the throat of the sediment inlet venturi 115 and can be activated to help move sediment into the venturi 115 and to break up any clumps or debris. In one embodiment, the auger/propeller 116 is powered electrically The diameter of the venturi 115 is preferably 2 to 30 inches. More preferably, the diameter of the venturi 115 can be 4 to 20 inches. Most preferably, the diameter of the venturi 115 can be 6 to 18 inches.

The diameter of the auger/propeller 116 is preferably 2 to 30 inches. More preferably, the diameter of the auger/propeller 116 can be 4 to 20 inches. Most preferably, the diameter of the auger/propeller 116 can be 6 to 18 inches.

An array of water jets 118 can be mounted slightly above the sediment inlet throat and preferably supplies the inlet with pressurized water 122 from a pump mounted on the platform. When required, the water jets can help liquefy the sediment that is compacted and not flowing sufficiently into the throat of the venturi 115.

The water jets 118 preferably have an output pressure of 10 to 100 psi. More preferably, the water jets 118 have an output pressure of 20 to 60 psi. Most preferably, water jets 118 have an output pressure of 30 to 50 psi.

In one embodiment, there is only one water jet.

In one embodiment, the apparatus 10 incorporates electrically or hydraulically driven vibrating mechanisms that will liquefy sediment flowing into the inlet.

Main flow control valve 120 preferably regulates how much clean water is fed into the suction side of the sediment pump 121, preferably controlling the suction pressure and flow through the venturi inlet 115. The liquefied sediment can be drawn into the suction side of the sediment pump 121 and pressurized for transport through the outflow pipeline 109.

In one embodiment, the primary sediment pump 121 is mounted underwater above the sediment sink or on the platform depending on the pumping requirements for the particular location.

In one embodiment, the apparatus 10 uses a two stage pumping process to preferably create more pressure to move the liquefied sediment longer distances in the outflow pipeline 109. In this embodiment, the primary sediment pump 121 feeds into a secondary booster pump mounted on the platform. In this embodiment, both pumps supply the outflow pipeline 109.

The secondary booster pump preferably has an output pressure of 10 to 200 psi. More preferably, the secondary booster pump has an output pressure of 20 to 160 psi. Most preferably, the secondary booster pump has an output pressure of 40 to 120 psi.

A preferred embodiment of the present invention includes redundancies into the apparatus 10 preferably restarting sediment flow even under worst-case conditions such as when the sediments are caked and compacted. The hydraulic powered auger 116 and pressurized water jets 118 preferably ensure that sediment flow can be restarted even with sediment clumping and external debris that may be unavoidable in normal conditions, as may happen when the system is shut down for a while. Mechanical components that are subject to wear and failure are preferably designed to be accessible from above the sediment sink so that they can be changed out when necessary.

A preferred embodiment of the present invention includes sensors preferably mounted within the apparatus 10 to preferably monitor important parameters in real time and send the measurements into a programmable logic controller (PLC) that will preferably control the operation of the apparatus 10. Sensors may include, but are not limited to: water flow sensor, sediment flow sensor, depth of sediment, depth of water, liquid pressure at venturi inlet, liquid pressure within pipeline, water supply pressure, pump revolutions per minute (rpm), hydraulic system pressures. The microprocessor control will preferably activate sediment harvesting automatically when sediment is available; otherwise it can preferably remain passively inactive.

In a preferred embodiment of the present invention after the sensors indicate that the central sediment pit above the sink has been relatively cleared, pressurized water 122 pumped from the platform will be preferably fed through the main flow control valve 120 and to the sediment conveyors 119. The conveyors 119 preferably extend outward radially from the sediment pit.

In a preferred embodiment of the present invention, the apparatus 10 preferably comprises four sediment conveyors 119 preferably one on each side of the square base of the sediment sink 107. The sediment conveyors 119 preferably comprise sediment inlets 125 that can draw sediments into the water flow by venturi effect and can deposit the liquefied sediment into the sediment pit.

The length of the sediment conveyor 119 is preferably 10 to 300 feet. More preferably, the length of the sediment conveyors 119 can be 20 to 200 feet. Most preferably, the length of the sediment conveyors 119 can be 30 to 150 feet.

The diameter of the sediment conveyor 119 is preferably 3 to 36 inches. More preferably, the diameter of the sediment conveyor 119 can be 4 to 24 inches. Most preferably, the diameter of the sediment conveyor 119 can be 6 to 18 inches.

In a preferred embodiment of the present invention, a discharge end of the sediment conveyor 119 is preferably fitted with a remote controlled pulsing valve 126. The remote controlled pulsing valve 126 is preferably closed to create a pulse of reverse pressure on a timed interval basis. The pulsed water pressure momentarily reverses the flow through the sediment inlets thereby helping to breakup compacted sediments and to liquefy the sediments to preferably ensure that the sediment inlets 125 remain clear and allow sediment to flow.

Figure 3:
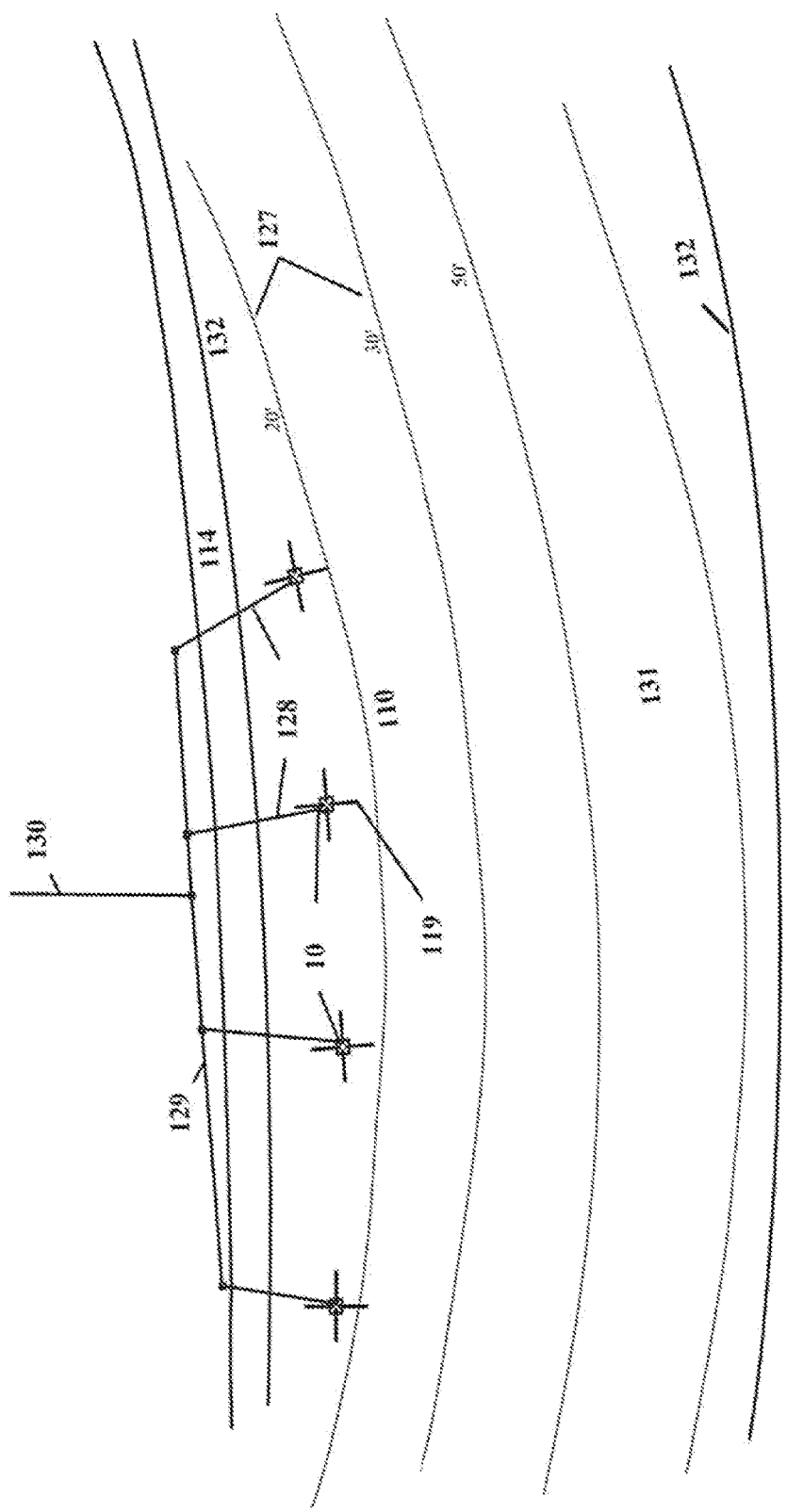
FIG. 3 is a top view of a preferred embodiment of the system of the present invention showing a section of river with an array of four sediment harvesting platforms connected in parallel to a sediment delivery pipeline.

A preferred embodiment of the invention includes a method for the deploying the apparatuses 10 of the present invention preferably in series, wherein the sediment harvesting platforms 101 are preferably and strategically placed in the river bed 100 within the natural sand bars 110 outside of the traditional river navigational channel 131, as depicted in FIG. 3. An array of four sediment harvesting platforms 101 are preferably placed in a sandbar 110. The sediment conveyors 119 preferably extend the capacity of each platform. The sediment feeders 128 are preferably the outflow lines that carry sediment to the shore where they can be connected to a manifold 129 that can connect to the sediment delivery pipeline 130.

In one embodiment of the present invention, existing shore-side electrical power preferably supplies power to the platform 101 to run the hydraulic system, controls and pumps in areas where the apparatus 10 is close to the river banks.

In one embodiment, four or more sediments sinks in a parallel configuration preferably provide more material over a larger time span to the sediment delivery pipeline. This preferably increases economic efficiency of the sediment delivery project.

The removal of sediment through the sink will preferably increase water depth at that location. Using the USACE report about sedimentation rates in the lower Mississippi River suggesting that approximately 80% of the main sediments removed from a burrow (dredged) area are replenished by the river in one year's time, the annual capacity of the sediment harvesting platform can be approximated by taking 80% of the sediment pit volume combined with the volume of the pits created by the sediment conveyors.

The deployment of sediment harvesting platforms in a river bed preferably increases the average effective depth in that section of the river, meaning an increase of the transverse sectional area of the river channel and a proportionate decrease in the flow velocity in that section of the river as shown in FIG. 3. When water velocity decreases, the ability to carry suspended sediment also decreases; this causes sediment to fall to the bottom. By strategically placing the sediment harvesting platforms in an extended length of the river, theoretically engineers will have a tool that will enable them to design a system to control sediment flow in the river. With these tools, engineers will be able to design a system that greatly increases the supply of sediments available for harvesting for restoration purposes, while reducing sedimentation at the lower end of the river, near the passes where shoaling is prevalent, which, in turn, would save tremendously on dredging cost there.

Figure 4:
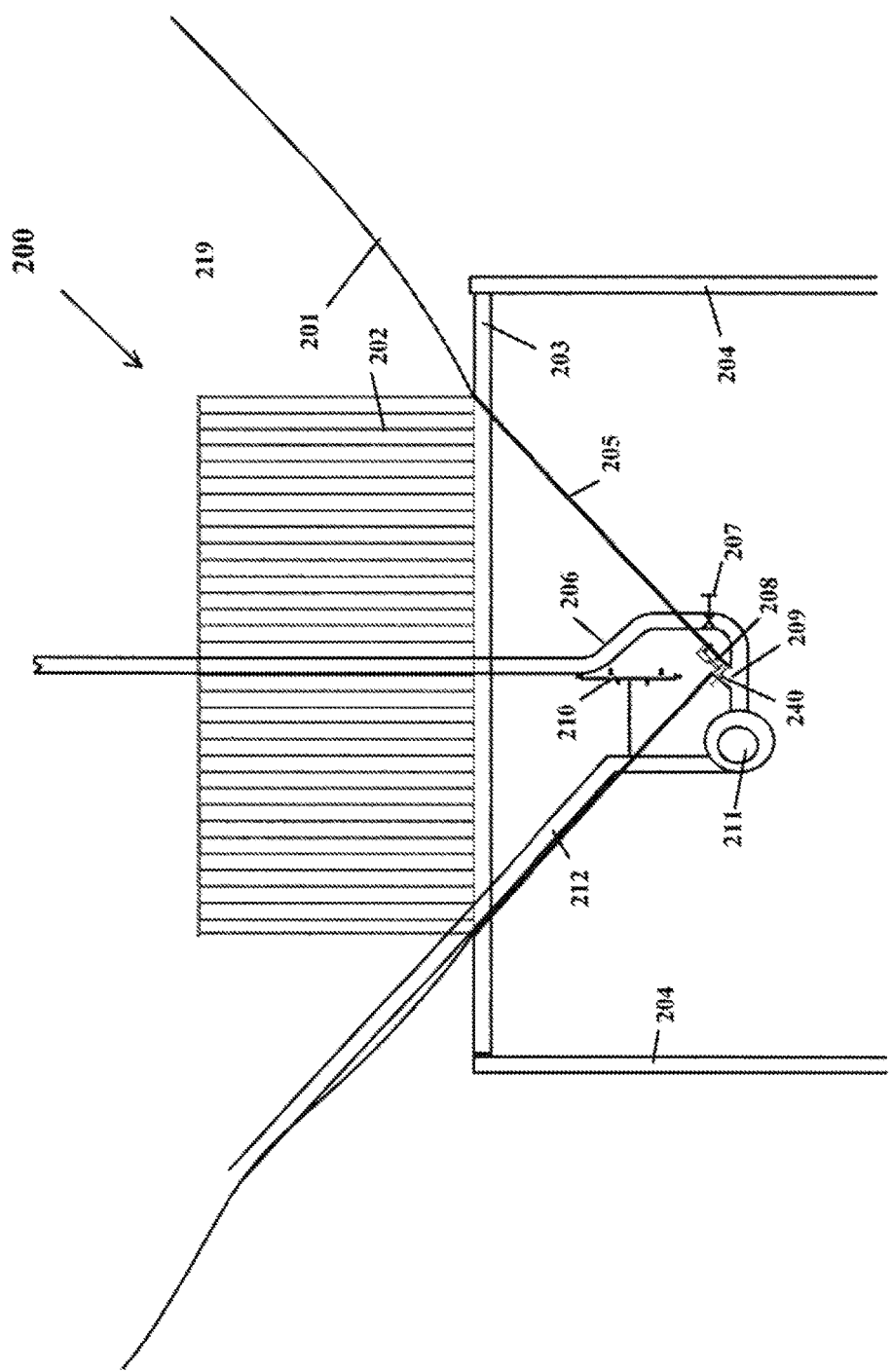
FIG. 4 is a sectional view of an alternative embodiment of the apparatus of the present invention showing the sediment sink.
Figure 5:
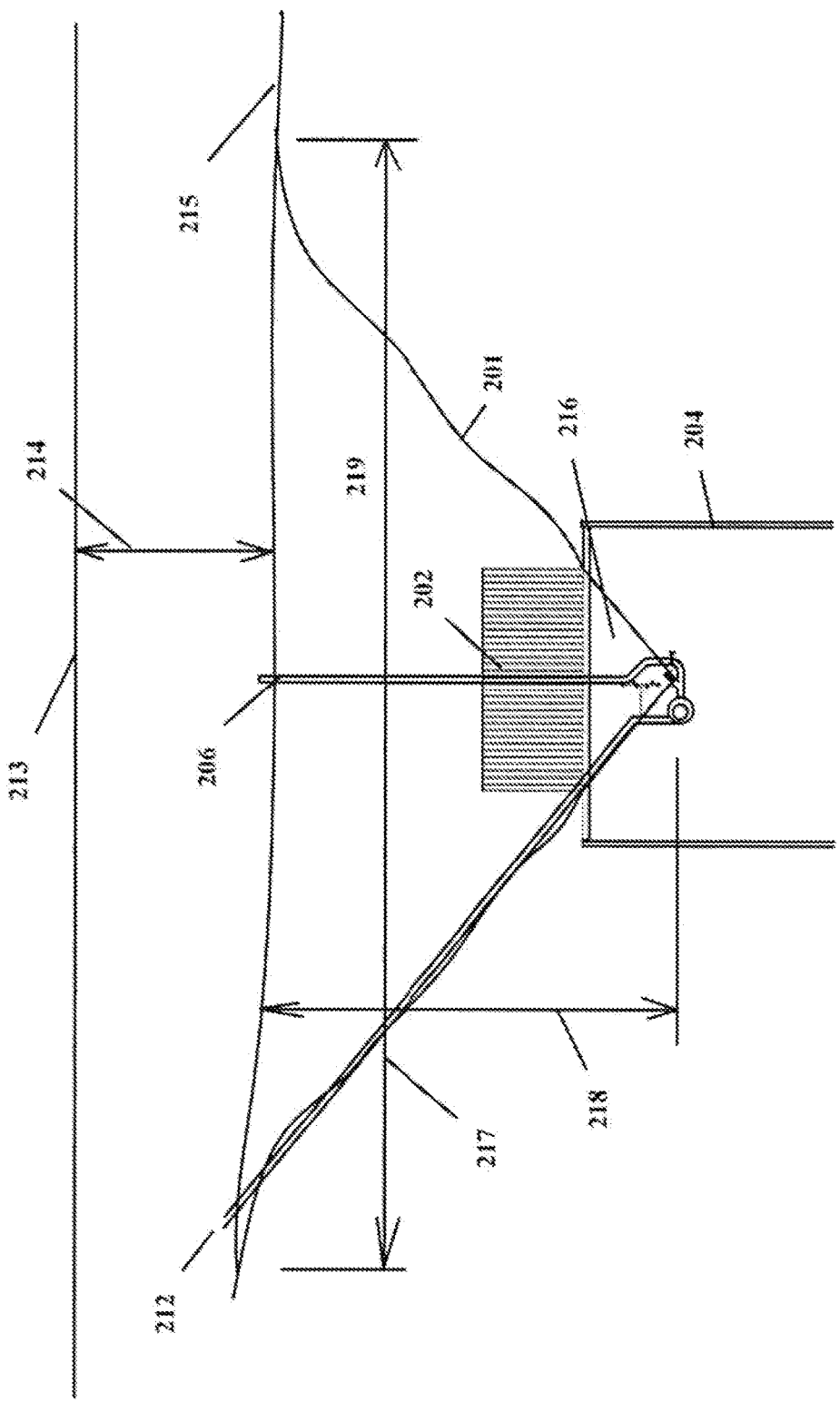
FIG. 5 is a side view of an alternative embodiment of the apparatus of the present invention of a sediment sink.

FIGS. 4 and 5 shows an alternative embodiment of the present invention of an apparatus 200 comprising a suction inlet and sediment sink. In an embodiment of the present invention, the apparatus 200 may draw sediment, material, etc. into a pipeline 212 in a fluid state. The apparatus 200 of an embodiment of the present invention can be a mechanical element, which may be mounted in a fixed position below a source of sediment or granular material, for the purpose of evacuating the material by carrying it within a liquid (e.g. water) via a pipeline. The apparatus 200 of an embodiment of the present invention can be positioned well below the level of the source sediment or granular material so that the material, which is in the proximity of the inlet, can flow downward toward the inlet aided by gravity. The apparatus 200 of an embodiment of the present invention may be held in a fixed position by a structure under the normal surface of the sediment. For example in a river, the sediment inlet can be held by pilings driven into the seabed well below the elevation of the suction inlet. The properties of the apparatus 200 of this embodiment allow for deployment of a fixed system within rivers and water streams that can harvest sediment more efficiently, and have better control of sedimentation than existing methods.

FIG. 4 depicts a side view of the sediment sink of an alternative embodiment. The side walls 205 of one embodiment of the present invention may be shaped in the configuration of a cone or an inverted pyramid. Alternatively, the sink can have a square or rectangular shape, with side walls 205 placed in a generally vertical position. Steel grating 202 of one embodiment of the present invention may be made of pipe or flat-bar covers the top of the sediment sink in order to prevent debris and obstructions from entering the sink. Alternatively, the grating of embodiment of the present invention can be made of plastic or composite material.

Steel pilings 204 and support structure of this embodiment may be embedded into the riverbed to provide attachment to hold the sink in place.

Alternatively, the pilings 204 and support structure of any embodiment of the present invention can be made of wood, plastic, or composite material.

The water suction supply 206 piping of one embodiment of the present invention may be mounted above the sediment sink to be able to draw "cleaner" water from above the normal river bed surface, or alternatively the suction supply pipe 206 may be routed alongside the outflow pipe with the clean water inlet at a location closer to the bank for better accessibility.

The water supply 206 may be attached to the sediment pump suction. Outflow from the sediment pump 211 may be put into the outflow pipeline 212. When water circulation is started through the sediment pump 211, venturi 209 at the bottom of the sediment sink inlet may create suction and begins to liquefy sediment at the bottom of the sink. In the throat of the sediment inlet there may be a hydraulic powered auger/propeller 208 that is activated to move sediment into the venturi 209.

Mounted slightly above the sediment inlet throat may be an array of water jets 210 with a water supply 206 from the pressured outflow of the sediment pump 211. The water jets 210 may be activated, when required, to help liquefy the sediment in cases where the sediment is compacted and not flowing sufficiently into the throat. With primary water flow established providing suction at the venturi 209, and the sediment being liquefied at the bottom of the sink sediment is being drawn into the suction side of the sediment pump 211. As the sediment is drawn out of the bottom of the sediment sink, a cavity may be formed of water and liquefied sediment and sediment above and around the cavity is drawn into the slurry, and by gravity led into the throat.

FIG. 5 depicts the sediment sink 216 mounted in the bottom of a river bed relative to the river surface and normal river bottom of an alternative embodiment. The water supply pipe 206 may be mounted to be able to draw water unobstructed. As the sediment sink 216 evacuates sediment from the bottom, sediment may be drawn downward by gravity and water currents. Eventually, a sediment pit may be formed that opens up to the river bottom.

In one embodiment, the slope of the sediment pit wall may be dependent on the type of sediment and the amount of water current in the pit. When the pit is opened to the river bed, controls may measure the sediment depth in the sink in real time can be used to activate the sediment pump and etc. as needed.

The apparatus of one embodiment of the present invention is a sediment suction inlet that is designed to be self-starting. Should it become inundated and compacted with sediment to a degree that sediment flow is halted, for example, after being shut down for a while, it may restart the sediment flow automatically. This may be done by incorporating a "clean" water inlet 206 to create independent primary water circulation below the inlet, and to supply the water jets with pressurized water. The water jets 210 may liquefy the sediment to help restart the sediment flow into the throat. With water circulating in the venturi 209, a vacuum may be created that draws liquefied sediment into the pipeline 212. The hydraulically powered auger in the inlet further aids in moving sediment into the water stream. The apparatus 200 may also incorporate electrically or hydraulically driven vibrating mechanisms that will be used to help liquefy the sediment flowing into the inlet.

The apparatus 200 may also incorporate an electrically or hydraulically driven pump that may force liquefied material down the pipeline 212 toward its intended destination. In one embodiment of the present invention, the clean water inlet may include a remotely controlled valve 207 to adjust the flow of clean water entering at the bottom of the inlet thereby controlling the amount of suction and flow at the venturi 209 and through the throat. In one embodiment of the present invention, the apparatus may incorporate sensors mounted within it to monitor important parameters in real time and send the measurements into a programmable logic controller (PLC) that will control the operation of the apparatus. Sensors may include, but are not limited to: water flow sensor, sediment flow sensor, depth of sediment, depth of water, liquid pressure at venturi 209 inlet, liquid pressure within pipeline, water supply pressure, pump rpm, hydraulic system pressures.

In one embodiment, the suction inlet sediment sink apparatus 200 may be designed with a grating 202 to prevent debris from entering the sediment inlet and to be easily cleaned of any debris and foreign objects when necessary.

Figure 6:
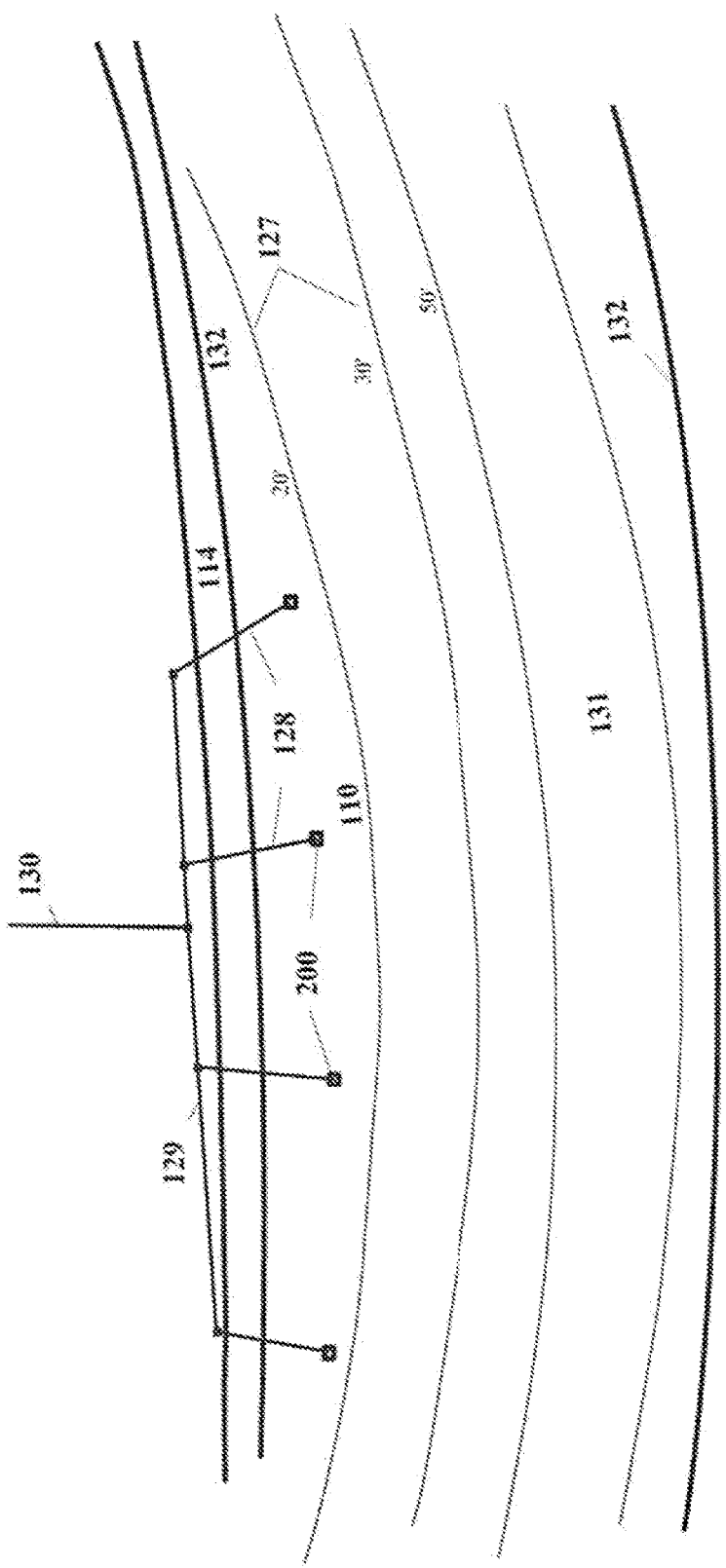
FIG. 6 is a top view of an alternative embodiment of the system of the present invention showing a section of river with an array of four sediment harvesting platforms connected in parallel to a sediment delivery pipeline.

One embodiment of the invention includes a method for the deploying the apparatuses 200 in series, wherein the sediment sinks 200 are strategically placed in a river bed within the natural sand bars, outside of the traditional river navigational channel as shown in FIG. 6. In areas where the sand bars are close to the existing river levee electrical power can be easily supplied to the sediment sink(s) to run the hydraulic system, controls and pumps. Having three or four sediments sinks configured in parallel will provide more material over a larger time span to the sediment delivery pipeline. This will increase economic efficiency of the sediment delivery project.

A river sediment control design may be achieved by placing an array of sediment sinks within a close proximity to each other. The removal of sediment through the sink will cause increased water depth at that location. The increased depth created by the sinks will increase the transverse area of the river channel, thereby decreasing the flow velocity. When water velocity decreases, the ability to carry suspended sediment also decreases; this causes sediment to fall to the bottom. By strategically placing the sinks in an extended length of the river, engineers will be able to control sediment flow in the river, and have a greater amount of natural supply of sediments available for harvesting for restoration purposes. That also opens the possibility to reduce sedimentation at the lower end of the river, near the passes where shoaling is prevalent, which, in turn, would save tremendously on dredging cost there.

The following is a list of parts and materials suitable for use in the present invention:

PARTS LIST:

| Parts Number | Description |
| --- | --- |
| 10 | Sediment harvesting apparatus |
| 100 | River Bottom |
| 101 | Platform |
| 102 | River Surface |
| 103 | Electrical Power Line |
| 104 | Shelter |
| 105 | Hydraulic/Electrical/Control Connections; Electrical Control Cables |
| 106 | Steel Grating |
| 107 | Sediment Sink |
| 108 | Pilings |
| 109 | Pipeline |
| 110 | Sandbar |
| 111 | Depth of Sediment Pit |
| 112 | Sediment Pit Wall |
| 113 | River Channel Width |
| 114 | Flood Protection Levee |
| 115 | Venturi |
| 116 | Auger |
| 117 | Sediment Pit |
| 118 | Water Jets |
| 119 | Sediment Conveyors |
| 120 | Main Flow Control Valve |
| 121 | Sediment Pump |
| 122 | Pressurized Water Flow |
| 123 | Platform Legs |
| 124 | Support Structure |
| 125 | Inlets |
| 126 | Pulsing Valve |
| 127 | Depth Contours |
| 128 | Sediment Feeders |
| 129 | Manifold |
| 130 | Delivery Pipeline |
| 131 | River Navigational Channel |
| 132 | River Bank |
| 140 | Shut-off Valve |
| 150 | Side Wall |
| 170 | Arrows |
| 200 | Sediment Sink Apparatus |
| 201 | Sediment Wall |
| 202 | Grating |
| 203 | Support Structure |
| 204 | Pilings |
| 205 | Side Wall |
| 206 | Clean Water Suction Supply |
| 207 | Flow Control Valve |
| 208 | Auger |
| 209 | Venturi Tube |
| 210 | Water Jets |
| 211 | Sediment Pump |
| 212 | Outflow Pipeline |
| 213 | River Surface |
| 214 | Water depth |
| 215 | Normal River Bottom |
| 216 | Sediment Sink |
| 217 | Width of Sediment Pit |
| 218 | Depth of Sediment Pit |
| 219 | Sediment Pit |
| 240 | Shut-off Valve |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for removing sediment from a bottom of a waterway comprising:
    a) a platform positioned above a water surface of the waterway, said platform having a plurality of legs embedded in the waterway bottom;

b) a sediment sink positioned below the platform and in the bottom of the waterway below a top layer of the sediment, the sediment sink having a top, a bottom inlet, and a side wall, the sediment sink operably attached to the platform legs;

c) a grating positioned above the top of the sediment sink;

d) a pressurized water flow comprising water from the waterway provided via the platform; and e) a sediment evacuation element positioned at the bottom of the sediment sink that receives the pressurized water flow, including a venturi positioned below the bottom inlet of the sediment sink and fluidly connected to the sediment sink, an auger positioned in the sediment sink bottom inlet and above the venturi;

a water jet fluidly connected to and receiving water from the pressurized water flow, the water jet positioned above the sediment sink bottom inlet, said water jet configured to liquefy the sediment flowing into the sediment sink bottom inlet and venturi, an outflow pipeline positioned downstream of the venturi, a sediment pump fluidly connected to the venturi and outflow pipeline, wherein operation of the sediment pump creates suction pressure at the sediment sink bottom inlet, and a flow control valve regulating the pressurized water flow through the sediment evacuation element, wherein said flow control valve regulates the pressurized water flow through the sediment pump which thereby creates the said suction pressure at the sediment sink bottom inlet and said flow control valve regulates the pressurized water flowing to the venturi; and f) wherein the apparatus is anchored into the waterway bottom.

2. The apparatus of claim 1, wherein the sediment evacuation element further comprises a sediment conveyor extending past the side wall of the sediment sink and having a plurality of inlets and a pulsing valve.

3. The apparatus of claim 1 further comprising a sensor for measuring operating parameters of the apparatus and a programmable logic controller that receives measurements from the sensor and monitors and controls operation of the apparatus.

4. The apparatus of claim 1, wherein the sediment evacuation element further comprises a second sediment pump fluidly connected to the venturi and outflow pipeline.

5. The apparatus of claim 1 further comprising a water pump, where operation of the water pump forms the pressurized water flow.

6. The apparatus of claim 1, further comprising a hydraulic pump and control unit operably connected to the sediment evacuation element.

7. The apparatus of claim 1, further comprising a power supply and connections operably connected to the sediment evacuation element.

8. The apparatus of claim 1, further comprising sediment pipeline connections operably connected to the sediment evacuation element.

9. The apparatus of claim 1, further comprising a monitoring and control unit operably connected to the sediment evacuation element.

10. The apparatus of claim 1, wherein the auger is positioned adjacent to the inlet of the venturi.

11. A method of removing sediment from a bottom of a waterway comprising the steps of:

a) anchoring an apparatus into the bottom of the waterway, the apparatus comprising a platform positioned above a water surface of the waterway, said platform having a plurality of legs embedded in the waterway bottom, a sediment sink positioned below the platform and in the bottom of the waterway below a top layer of the sediment, the sediment sink having a top, bottom inlet, and side wall, the sediment sink attached to the platform legs, a grating positioned above the top of the sediment sink, a water pump creating pressurized water flow with water from the waterway provided via the platform, and a sediment evacuation element positioned at the bottom of the sediment sink that receives the pressurized water flow and includes a venturi positioned below the bottom inlet of the sediment sink and having an inlet fluidly connected to the sediment sink, an auger positioned in the sediment sink bottom inlet and above the venturi;

a water jet positioned above the sediment sink bottom inlet, said water jet configured to liquefy the sediment flowing into the sediment sink bottom inlet and venturi, an outflow pipeline positioned downstream of the venturi, a sediment pump fluidly connected to the venturi and outflow pipeline wherein operation of the sediment pump creates suction pressure at the sediment sink bottom inlet, and a flow control valve regulating the pressurized water flow through the sediment evacuation element; and b) engaging the flow control valve to direct the pressurized water flow through the sediment evacuation element such that a portion of the pressurized water flow is expelled through the water jet and into the sediment sink to form a sediment slurry and the flow control valve regulates the pressurized water flow flowing through the venturi which creates suction to move the slurry through the venturi inlet; and c) engaging the flow control valve to stop the pressurized water flow from flowing through the sediment evacuation element and engaging the sediment pump to pump the slurry to the outflow pipeline.

12. The method of 11, wherein the sediment evacuation element of step "a)" further comprises a sediment conveyor extending past the side wall of the sediment sink and having a plurality of sediment inlets and a pulsing valve.

13. The method of claim 12 further comprising the step of engaging the flow control valve to direct the pressurized water flow through the sediment conveyor such that sediment is drawn through the inlets of the sediment conveyor.

14. The method of claim 13 further comprising the step of using the pulsing valve to create pulsed water pressure within the sediment conveyor for slurrying sediment.

15. The method of claim 11, wherein the apparatus of step "a)" further comprises a sensor for measuring operating parameters of the apparatus and a programmable logic controller that receives measurements from the sensor and monitors and controls operation of the apparatus.

16. The method of claim 15 further comprising the steps of sending parameters from the sensor in real time to the programmable logic controller and using the programmable logic controller to monitor and control operation of the apparatus.

17. The method of claim 11, wherein the sediment evacuation element of step "a)" further comprises an auger positioned adjacent to the inlet of the venturi and step "b)" further includes engaging the auger in combination with the suction to move slurry through the inlet.

18. A system for sediment control and altering the average effective depth of a section of a waterway having a bottom, comprising:
a) a plurality of sediment removing apparatuses anchored into the bottom of the section of the waterway and spatially positioned along the section of the waterway, each sediment removing apparatus having
a platform positioned above a water surface of the waterway, said platform having a plurality of legs embedded in the waterway bottom,
a sediment sink positioned in the bottom of the section of the waterway below a top layer of the sediment, the sediment sink having a top, bottom inlet, and side wall, the sediment sink operably attached to the platform legs,
a grating positioned above the top of the sediment sink,
a pressurized water flow comprising water from the waterway provided via the platform, and
a sediment evacuation element positioned at the bottom of the sediment sink that receives the pressurized water flow and includes
a venturi positioned below the bottom inlet of the sediment sink and fluidly connected to the sediment sink,
an auger positioned in the sediment sink bottom inlet and above the venturi;
a water jet fluidly connected to and receiving water from the pressurized water flow, the water jet positioned above the sediment sink bottom inlet, said water jet configured to liquefy the sediment flowing into the sediment sink bottom inlet and venturi,
an outflow pipeline positioned downstream of the venturi,
a sediment pump fluidly connected to the venturi and outflow pipeline wherein operation of the sediment pump creates suction pressure at the sediment sink bottom inlet, and
a flow control valve regulating the pressurized water flow through the sediment evacuation element, wherein said flow control valve regulates the pressurized water flow through the sediment pump which thereby creates the said suction pressure at the sediment sink bottom inlet and said flow control valve regulates the pressurized water flowing to the venturi;
b) a manifold connected to outflow pipeline of each sediment removing apparatus;
c) a delivery pipeline connected to the manifold; and
d) wherein at least one of the sediment removing apparatuses removes sediment from the bottom of the section of the waterway and pumps the sediment through at least one of the outflow pipelines and manifold and into the delivery pipeline.

19. The system of claim 18, wherein the sediment evacuation element of at least one of the sediment removing apparatuses further comprises a sediment conveyor extending past the side wall of the sediment sink and having a plurality of inlets and a pulsing valve.

20. The system of claim 18, wherein at least one of the sediment removing apparatuses further comprises a sensor for measuring operating parameters of the at least one of the sediment removing apparatuses and a programmable logic controller that receives measurements from the sensor and monitors and controls operation of the at least one of the sediment removing apparatuses.

\* \* \* \* \*